(12) United States Patent
Pons et al.

(10) Patent No.: US 8,647,071 B2
(45) Date of Patent: Feb. 11, 2014

(54) HOLLOW TURBINE WHEEL VANE COMPRISING A RIB AND ASSOCIATED WHEEL AND TURBOMACHINE

(75) Inventors: Lorenzo Pons, Gelos (FR); Laurence Vial, Jurancon (FR)

(73) Assignee: Turbomeca, Bordes (FR)

( * ) Notice: Subject to any disclaimer, the term of this patent is extended or adjusted under 35 U.S.C. 154(b) by 419 days.

(21) Appl. No.: 13/055,037

(22) PCT Filed: Jul. 21, 2009

(86) PCT No.: PCT/FR2009/051450
§ 371 (c)(1),
(2), (4) Date: Jan. 20, 2011

(87) PCT Pub. No.: WO2010/010284
PCT Pub. Date: Jan. 28, 2010

(65) Prior Publication Data
US 2011/0123350 A1 May 26, 2011

(30) Foreign Application Priority Data
Jul. 21, 2008 (FR) .................................... 08 54935

(51) Int. Cl.
*F01D 25/04* (2006.01)
*F01D 25/28* (2006.01)
(52) U.S. Cl.
USPC ...................................... 416/228; 415/173.1
(58) Field of Classification Search
USPC ................ 415/115, 116, 173.1, 173.5, 174.4; 416/97 R, 96 A, 228
See application file for complete search history.

(56) References Cited

U.S. PATENT DOCUMENTS

| 3,982,851 | A | * | 9/1976 | Andersen et al. ................ 416/92 |
| 4,020,538 | A | | 5/1977 | Dennis et al. |
| 5,232,343 | A | * | 8/1993 | Butts ........................... 416/97 R |
| 5,472,316 | A | * | 12/1995 | Taslim et al. ............... 416/97 R |
| 5,695,321 | A | * | 12/1997 | Kercher ....................... 416/97 R |
| 5,695,322 | A | * | 12/1997 | Jacobson et al. ............ 416/97 R |
| 5,700,132 | A | * | 12/1997 | Lampes et al. .............. 416/97 R |
| 6,068,443 | A | * | 5/2000 | Aoki et al. .................. 415/173.5 |
| 6,142,739 | A | * | 11/2000 | Harvey ........................ 416/235 |
| 6,367,687 | B1 | | 4/2002 | Reeves et al. |
| 7,029,235 | B2 | * | 4/2006 | Liang ............................. 416/92 |
| 7,118,329 | B2 | * | 10/2006 | Goodman ................. 415/173.1 |
| 7,473,073 | B1 | * | 1/2009 | Liang ........................ 415/173.5 |
| 2002/0197159 | A1 | | 12/2002 | Roeloffs |
| 2007/0237637 | A1 | * | 10/2007 | Lee et al. ..................... 416/97 R |
| 2008/0181766 | A1 | * | 7/2008 | Campbell et al. ............ 415/116 |
| 2012/0282108 | A1 | * | 11/2012 | Lee et al. ..................... 416/97 R |

FOREIGN PATENT DOCUMENTS

EP      1 267 041      12/2002

OTHER PUBLICATIONS

International Search Report Issued Nov. 25, 2009 in PCT/FR09/051450 filed Jul. 21, 2009.

* cited by examiner

*Primary Examiner* — Nathaniel Wiehe
*Assistant Examiner* — Wayne A Lambert
(74) *Attorney, Agent, or Firm* — Oblon, Spivak, McClelland, Maier & Neustadt, L.L.P.

(57) ABSTRACT

A turbine blade extends radially between a blade root and a blade tip having an open cavity referred to as a bathtub formed therein, which cavity is defined by a closed end wall and a side rim. The side rim of the cavity carries at least one rib extending between a leading edge and a trailing edge of the blade.

13 Claims, 5 Drawing Sheets

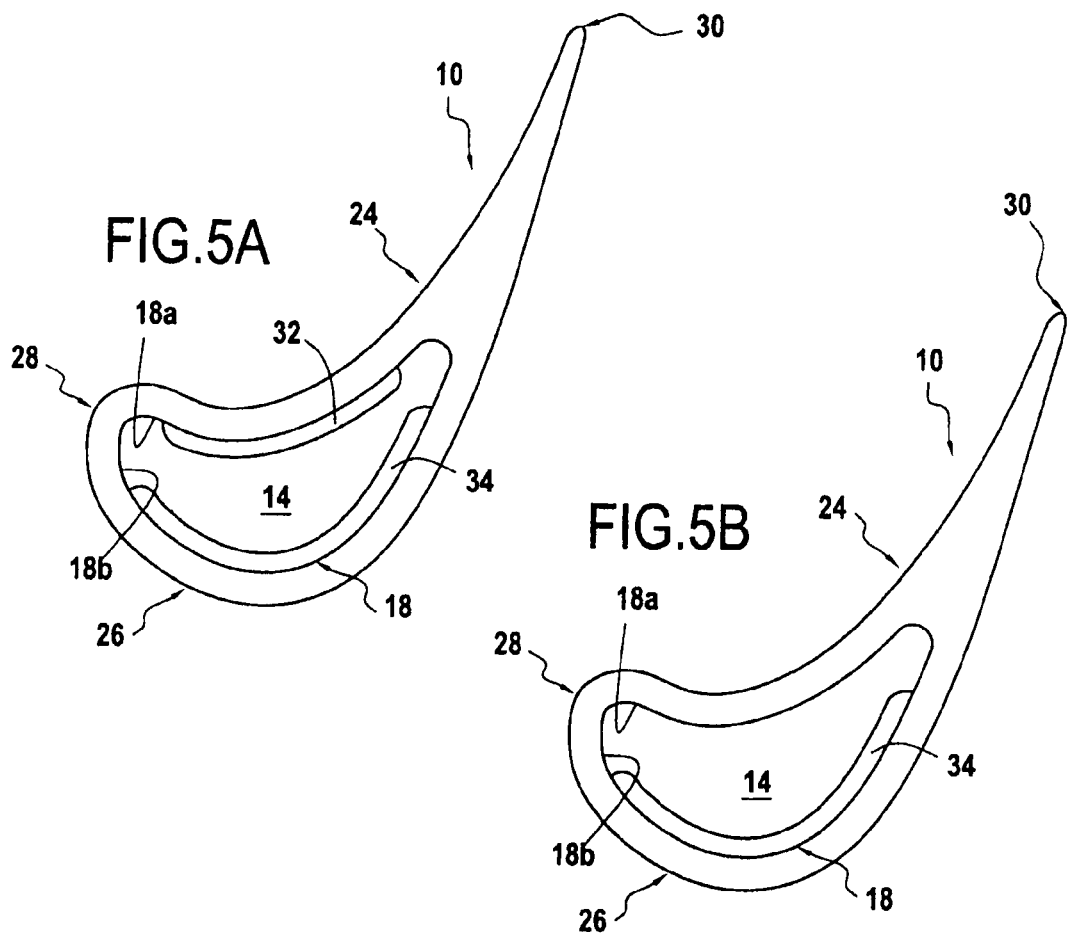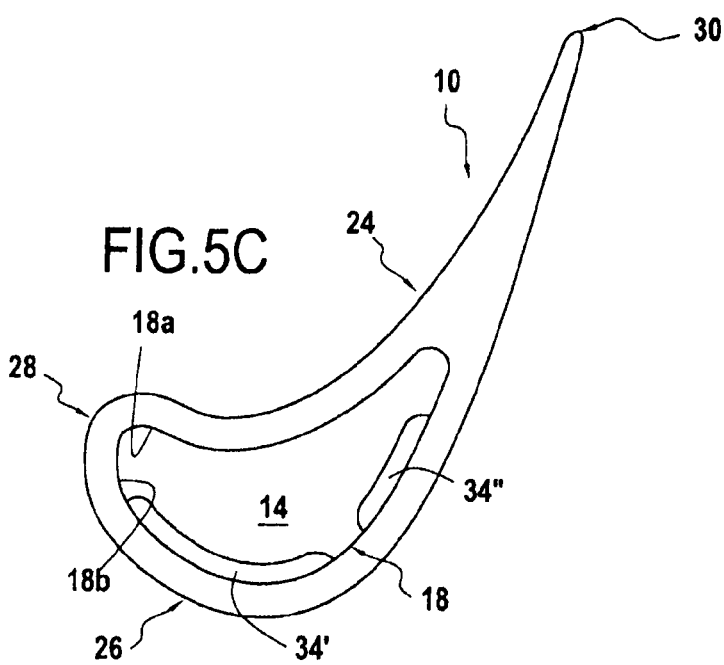

HOLLOW TURBINE WHEEL VANE COMPRISING A RIB AND ASSOCIATED WHEEL AND TURBOMACHINE

BACKGROUND OF THE INVENTION

1. Field of the Invention

The invention relates to a blade for a turbine rotor, and more particularly the invention relates to a hollow blade for a high-pressure gas turbine, in particular for a helicopter. Nevertheless, the invention is also applicable to engines for airplanes, and more generally to any gas turbine. The invention relates more particularly to a hollow blade of the type having a closed end wall, i.e. in which the end wall does not include an orifice, as contrasted to hollow blades of the type having an open end wall or that are said to be "cooled" and that do not form the subject matter of the present invention.

2. Description of the Related Art

As shown in FIGS. 1 and 2, for a turbine blade 10 extending radially between its root and its blade tip 12, an open cavity 14, referred to as a "bathtub", is generally provided that is defined by a closed end wall 16 and by a side rim 18. The radial direction R of the blade is relative to the rotor that supports it, the axial direction being the direction of the axis of the engine and is perpendicular to the radial direction. Such a blade conventionally presents a pressure side 24, a suction side 26, a leading edge 28, and a trailing edge 30.

Compared with a blade tip that is solid, the presence of the cavity 14 serves to lighten the blade and to modify the gas flow structure, thereby limiting undesirable flow of gas from the pressure side 24 towards the suction side 26 of the blade. Nevertheless, on flowing into the inside of the cavity 14, hot gas from the combustion chamber situated upstream from the turbine heats the walls of the cavity 14 by convection.

BRIEF SUMMARY OF THE INVENTION

An object of the present invention is to structure the flow of the hot gas in the cavity so as to diminish heat exchange between the hot gas and the walls of the cavity.

The invention achieves this object by the fact that the side rim of the cavity carries at least one rib extending between a leading edge and a trailing edge of the blade. It can thus be understood that said rib extends inside the cavity.

An advantage of such a blade is that said at least one rib of the side rim generates gas circulation that blocks the entrance to the cavity for the majority of the hot gas that might penetrate therein. Consequently, heat exchange between the hot gas and the walls of the cavity is reduced, and thus the walls of the cavity are stressed to a smaller extent from a thermal point of view.

Advantageously, said at least one rib extends in a plane that is substantially perpendicular to the radial direction of the blade, it being understood that "substantially perpendicular" is used to mean a plane at an angle lying in the range −30° to +30° relative to a plane that is strictly perpendicular to the radial direction of the blade. Preferably, said at least one rib extends in the plane that is strictly perpendicular to the radial direction of the blade. The inventors have found that in this configuration said at least one rib is effective in blocking the stream of hot gas that might enter into the cavity and thus heat its walls.

In a variant, the side rim includes at least two ribs. The presence of two ribs serves to further improve the blocking of gas at the entrance to the cavity. Preferably, the two ribs face each other.

Advantageously, the side rim presents at least two ribs inscribed in a common plane substantially perpendicular to the radial direction of the blade. Thus, the opening of the cavity is limited in a single common plane, thereby serving to limit entry of gas into the cavity.

Alternatively, side rim carries at least two ribs inscribed in two distinct planes that are substantially perpendicular to the radial direction of the blade. This difference in the positioning of the ribs in the radial direction serves to block the streams of gas that might penetrate into the cavity.

Furthermore, the side rim of the cavity is constituted by a first rim portion close to the pressure side of the blade and a second rim portion close to the suction side of the blade, and advantageously the side rim presents at least two ribs on a common portion of the rim. In this configuration, it is possible to finely adjust the blocking of streams of gas that might penetrate into the cavity and to reduce the extra weight represented by the ribs on the blade.

It should be observed that the term "rim portion" is used to mean a portion of the rim that extends between the leading edge and the trailing edge of the blade. The two rim portions are contiguous. The rim is thus made up of two rim portions: a first rim portion that extends between the leading edge and the trailing edge beside the pressure side of the blade, and a second rim portion that extends between the leading edge and the trailing edge beside the suction side of the blade.

Alternatively, still considering that the side rim is constituted by a first rim portion close to the pressure side of the blade and a second rim portion close to the suction side of the blade, the side rim presents at least two ribs situated on the two rim portions. Thus, the entrance to the cavity is made substantially smaller by the ribs and only a small stream of gas can penetrate into the cavity.

Advantageously, considered in the radial direction of the blade, said at least one rib is set back from the blade tip. As a result, a residual gap remains at the blade tip enabling the gas that might penetrate into the cavity to be confined effectively and thus improving the blockage at the entrance to the cavity.

Preferably, said at least one rib is substantially rectangular in section. The inventors have found that such ribs improve the blocking function. The term "substantially rectangular section" is used to cover a section that is rectangular, and also a section that is trapezoid, square, or in the form of a parallelogram.

The ribs may also be chamfered. A chamfered rib shape serves to reduce the weight of the rib while maintaining a connection interface between the rib and the rim that is sufficient to ensure the mechanical integrity of said connection. In addition, the chamfered shape of the ribs serves to create particular edge effect gas flows and thus to improve blockage of the streams of gas that might penetrate into the cavity.

The invention also provides a turbine rotor including at least one blade of the invention, and a turbomachine, such as a helicopter gas turbine, including at least one turbine rotor.

BRIEF DESCRIPTION OF THE SEVERAL VIEWS OF THE DRAWINGS

The invention and its advantages can be better understood on reading the following detailed description of various embodiments given as non-limiting examples. The description refers to the accompanying figures, in which:

FIG. 4A is a section view of the FIG. 3 blade on plane IV of FIG. 3, while

FIG. 5A is a view of the FIG. 3 blade seen looking along arrow V in FIG. 3, while FIGS. 5B and 5C show other embodiments of the blade of the invention.

DETAILED DESCRIPTION OF THE INVENTION

Figure 1:
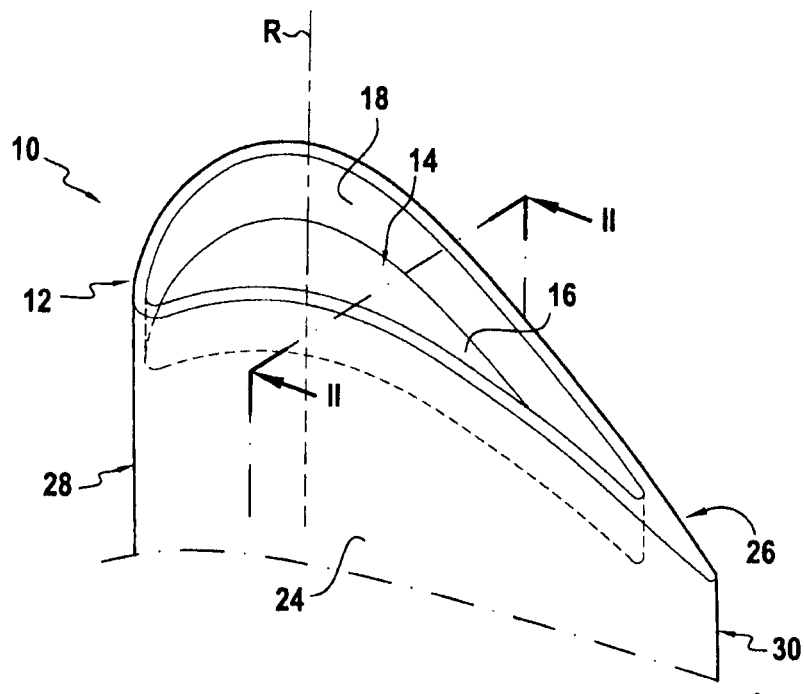
FIG. 1 is a perspective view of the tip of a prior art blade.
Figure 2:
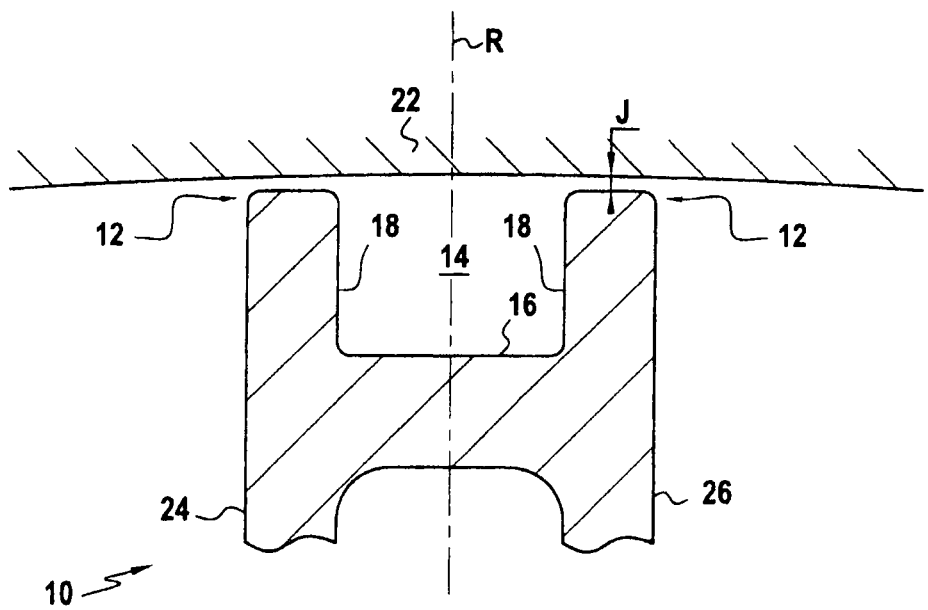
FIG. 2 is a section view of the FIG. 1 blade on plane II of FIG. 1.
Figure 3:
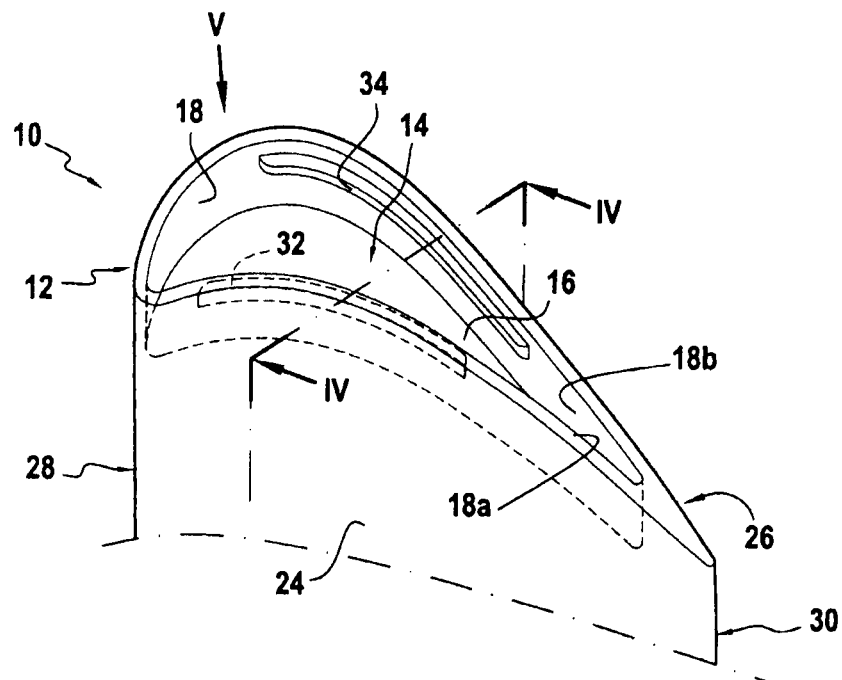
FIG. 3 is a perspective view of the tip of a blade in a first embodiment of the invention.

A first embodiment of the invention is described with reference to FIG. 3. FIG. 3 shows a high pressure turbine blade 10 extending radially between a blade root and the tip 12 of the blade in which there is formed an open cavity 14 referred to as a bathtub. This cavity 14 is defined by an end wall 16 that is closed, i.e. that has no orifice, and by a side rim 18. The side rim 18 is constituted by a first rim portion 18a close to the pressure side 24 of the blade, and a second rim portion 18b close to the suction side 26 of the blade. In accordance with the invention, the side rim 18 has at least one rib extending between the leading edge 28 and the trailing edge 30 of the blade 10.

In this example, the side rim 18 presents two ribs 32 and 34 extending respectively over the first rim portion 18a and the second rim portion 18b, each of the ribs projecting from a respective one of the portions 18a and 18b.

The rib 32 projects from the side rim 18 so as to define a groove between the closed end wall 16 and said rib 32. It can thus be understood that the rib 32 is disjoint from the closed end wall 16 and that a space is defined between the closed end wall 16 and the rib 32. In other words, the rib 32 is located between the closed end wall 16 and the tip of the blade 12. The rib 32 is thus not contiguous with the closed end wall 16. The same applies for the rib 34.

Thus, the presence of the ribs 32 and 34 extending between the leading edge 28 and the trailing edge 30 of the blade serves to block hot gas at the tip of the blade, such that little or no hot gas penetrates into the cavity 14. Compared with the prior art, the heating generated by convection on the walls of the cavity 14 is reduced.

The presence of a rib gives rise to disturbances (or edge effects) in gas flow. The inventors have found that a rib causes a turbulent structure to be created that has three levels of gas flow in the radial direction of the blade. Thus, in FIG. 4A, the gas coming from the pressure side 24 of the blade via the clearance J is blocked at the tip of the blade in a stationary rotary motion 13 (or vortex) that is "defined" by the ribs 32 and 34. Level with the ribs 32 and 34, the gas presents a different rotary motion 15, rotating in the opposite direction to the rotary motion 13. Inside the cavity 14, beneath the ribs 32 and 34, the gas has rotary motion 17 in the same direction of rotation as the rotary motion 13. Thus, when the incident gas is hot, the turbulent structure enables the incident gas that might heat the walls of the cavity 14 to be confined to the tip of the blade and limits the rate at which hot gas is renewed inside the cavity 14. In addition, this turbulent circulating gas structure serves to limit heat exchange between the different rotary motions of the gas. In addition, these rotary motions serve to make temperature more uniform between the pressure side 24 and the suction side 26 of the end wall 16 of the cavity 14, thereby giving rise to lower levels of mechanical stress as a result of temperature gradients in the walls. Thus, unlike the prior art, the walls of the cavity are heated little or not at all by the hot gas coming from the combustion chamber of the gas turbine, and they present better temperature uniformity.

Figure 4A:
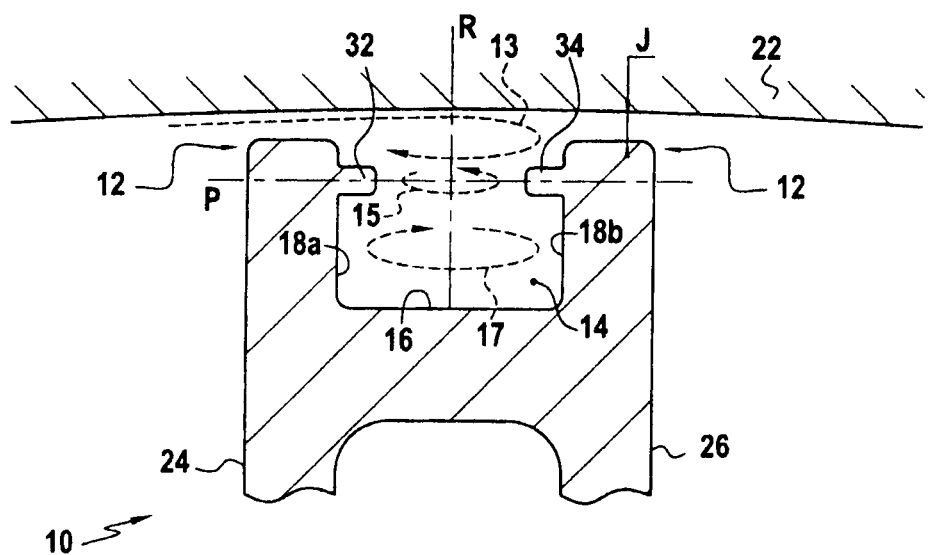

FIG. 4A is a section view of the FIG. 3 blade on plane IV of FIG. 3. In this example, the ribs 32 and 34 lie in the same plane P that is strictly perpendicular to the radial direction R of the blade 10. By generating contrarotating circulations of gas in the cavity, the ribs 32 and 34 serve to create edge effects at the entrance to the cavity, thereby preventing gas outside the cavity 14 from entering the cavity.

Figure 4B:
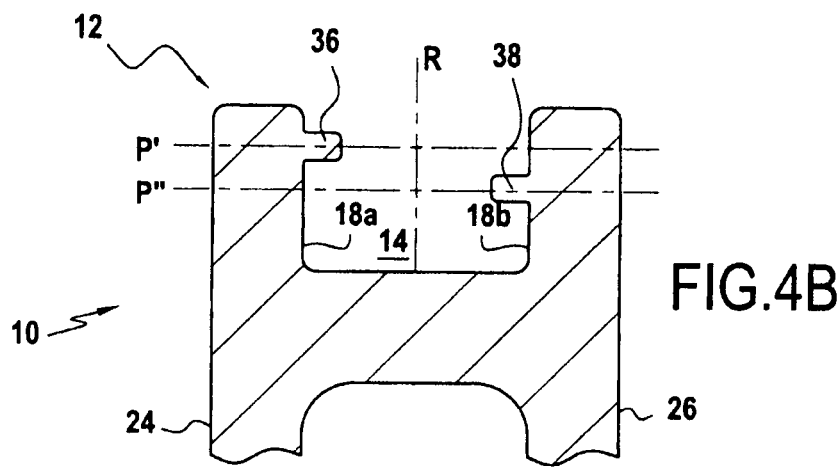
FIGS. 4B, 4C, and 4D show other embodiments of the blade of the invention.

In FIG. 4B, the ribs 36 and 38 are inscribed in two distinct planes P' and P'' that are strictly perpendicular to the radial direction R of the blades. In this configuration, the edge effects created by the ribs are effective in blocking the flows of gas that are substantially oblique relative to the radial direction R.

Since the high portion of the blade is the blade tip 12, the rib that is positioned higher up in this example is on the first rim portion 18a beside the pressure side 24 (i.e. the rib that is situated lower down is on the second rim portion 18b beside the suction side 26). Naturally, in another embodiment, the rib situated higher up may be on the second rim portion 18b beside the suction side 26 (i.e. the rib situated lower down is situated on the first rim portion 18a, beside the pressure side 24).

Figure 4C:
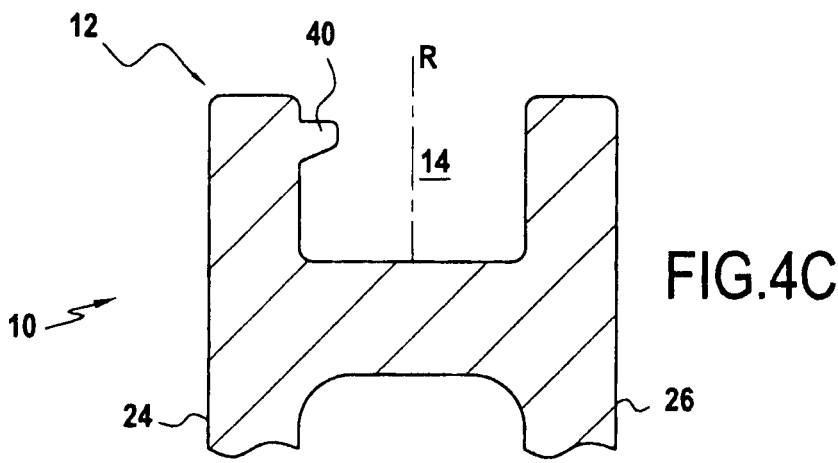
Figure 4D:
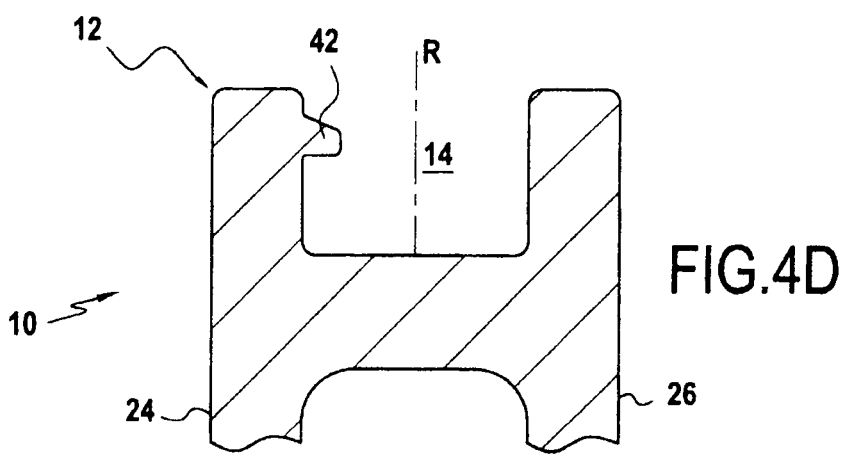

In FIGS. 4A and 4B, the ribs 32 & 34 and 36 & 38 are of substantially rectangular section. In FIGS. 4C and 4D, the ribs 40 and 42 are chamfered. Thus, it is possible to adjust the shape of the ribs in order to improve the edge effect and thus improve the blockage of gas at the entrance to the cavity 14 while also making the device lighter.

In FIGS. 4A, 4B, 4C, and 4D, with the blade 10 being considered in its radial direction R, the ribs 32, 34, 36, 38, 40, and 42 are set back from the blade tip 12. By leaving a gap between the blade tip 12 and the entrance to the cavity as defined by the ribs, it is possible to confine the gas that might penetrate into the cavity 14 inside this gap. This gap serves to generate gas circulation between the casing 22 of the turbine and the blade tip 12. This improves the blockage of gas at the entrance to the cavity 14.

FIG. 5A is a view looking along arrow V of FIG. 3. This figure corresponds to the view in FIG. 4A. A view looking down on the variant of FIG. 4B (where the "top" is the blade tip 12) would look similar. Thus, this example shows how the ribs 32 & 34 or 36 & 38 may be situated along the two rim portions 18a and 18b.

FIG. 5B shows an embodiment in which a single rib 34 extends over the second rim portion 18b beside the suction side 26. Depending on the conditions of use of the blade, this variant suffices to block a stream of gas that might penetrate into the cavity 14. In an alternative rim embodiment, a single rib extends over the first rim portion 18a, beside the pressure side 24.

FIG. 5C shows a variant of FIG. 5B. Two ribs 34' and 34'' are situated on the same rim portion 18b (or alternatively on the rim portion 18a). Thus, the length of the rib that is omitted compared with the embodiment of FIG. 5B serves to reduce the extra weight represented by the rib 34. This type of embodiment also serves to position a plurality of ribs easily on the same rim portion, with the rib being radially offset. Thus, it is possible to refine the edge effects that disturb the stream of gas that might penetrate into the cavity 14 and thus to improve the blocking of gas at the entrance to the cavity 14.

In addition, depending on the embodiment selected, the two ribs 34' and 34'' may be selected to be in line with each other (both being inscribed in the same plane or the same surface), or in a variant they are radially offset.

In the example of FIG. 5C, although two ribs are shown, an arbitrary number of ribs could be envisaged. In another embodiment, a single rib 34' or 34'', etc., could be provided.

In the present example, the rib 34' is longer than the rib 34", but in a variant, the rib 34' could be the same length as or shorter than the rib 34", depending on the desired effect.

Naturally, other embodiments can be envisaged: for example, it is possible to provide a plurality of ribs on each rim portion 18a and 18b beside both the pressure side 24 and the suction side 26. Alternatively, a single rib could be provided on the rim portion 18a beside the pressure side 24, and a plurality of ribs on the rim portion 18b beside the suction side 26, or vice versa. The rib(s) may be of section that is rectangular, trapezoidal, or square. Similarly, one, several, or all of the ribs may be chamfered. Thus, in various combinations, it is possible to define a rib configuration in the cavity 14 that satisfies a specific set of requirements depending on the particular conditions of use of a blade.

Figure 6:
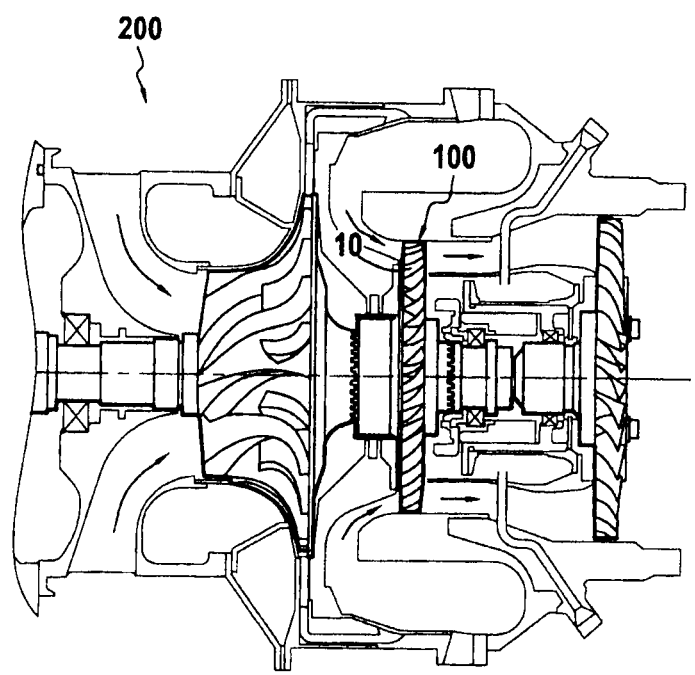
FIG. 6 is a view of a gas turbine having a turbine rotor fitted with a blade of the invention.

FIG. 6 shows a turbomachine 200, such as a helicopter gas turbine, having a high pressure turbine rotor 100, which rotor carries blades 10 in accordance with the present invention.

The invention claimed is:

1. A turbine blade extending radially between a blade root and a blade tip, comprising:
    an open cavity formed in the blade tip, which cavity is defined by a closed end wall and a side rim, the closed end wall being free of an orifice,
    wherein the side rim of the cavity carries at least one rib extending between a leading edge and a trailing edge of the blade,
    wherein the at least one rib is set back from the blade tip in a radial direction of the blade,
    wherein the at least one rib projects from the side rim so as to define a groove between the closed end wall and the at least one rib, and
    wherein the at least one rib causes, while working, a turbulent structure having three levels of gas flow in the radial direction.

2. A blade according to claim 1, wherein the at least one rib extends in a plane that is substantially perpendicular to the radial direction of the blade.

3. A blade according to claim 1, wherein the side rim includes at least two ribs.

4. A blade according to claim 3, wherein the ribs are inscribed in a common plane substantially perpendicular to the radial direction of the blade.

5. A blade according to claim 3, wherein the ribs are inscribed in two distinct planes that are substantially perpendicular to the radial direction of the blade.

6. A blade according to claim 3, wherein the side rim includes a first rim portion close to a pressure side of the blade, and a second rim portion close to a suction side of the blade, and the ribs are situated on a common one of the rim portions.

7. A blade according to claim 3, wherein the side rim includes a first rim portion close to a pressure side of the blade, and a second rim portion close to a suction side of the blade, and the ribs are situated on both rim portions.

8. A blade according to claim 1, wherein the at least one rib is of substantially rectangular section.

9. A blade according to claim 1, wherein the at least one rib is chamfered.

10. A turbine rotor including at least one blade according to claim 1.

11. A turbomachine, or a helicopter gas turbine, including at least one turbine rotor according to claim 10.

12. A blade according to claim 1, wherein the gas flow of a first level of the turbulent structure is above the at least one rib in the radial direction, the gas flow of a second level of the turbulent structure is level with the at least one rib in the radial direction, and the gas flow of a third level of the turbulent structure is beneath the at least one rib in the radial direction.

13. A blade according to claim 12, wherein the gas flow of the first and third levels of the turbulent structure rotates in a first direction and the gas flow of the second level of the turbulent structure rotates in a second direction opposite the first direction.

* * * * *